United States Patent [19]

Jaulmes

[11] 4,109,148

[45] Aug. 22, 1978

[54] TRANSPARENT PLATES WITH A RADIOGRAPH THEREON AND PROCESS FOR THE PREPARATION THEREOF

[75] Inventor: Eric Jaulmes, Paris, France

[73] Assignee: Ateliers de la Motobecane, Pantin, France

[21] Appl. No.: 776,312

[22] Filed: Mar. 10, 1977

[30] Foreign Application Priority Data

Mar. 15, 1976 [FR] France ............................... 76 07378

[51] Int. Cl.[2] ............................................ G03B 41/16

[52] U.S. Cl. .................................... 250/321; 250/323

[58] Field of Search ............... 250/320, 321, 322, 323, 250/475

[56] References Cited

U.S. PATENT DOCUMENTS 3,348,319 10/1967 Harrison ............................. 250/320

*Primary Examiner*—Craig E. Church

*Attorney, Agent, or Firm*—J. Harold Nissen

[57] ABSTRACT

A transparent plate and a process for the preparation thereof whose transparence at every point is a function of the coordinates of this point. A three-dimensional form representative of said function is made which has a base of a contour homothetic to that of the transparent surface to be made, and the thickness measured from the base is proportional to the values of the function, the form being made from a material which absorbs X-rays. A radiograph of this three-dimensional form is then made on the desired scale, and the transparent plate is the support of the radiograph thus obtained.

10 Claims, 4 Drawing Figures

TRANSPARENT PLATES WITH A RADIOGRAPH THEREON AND PROCESS FOR THE PREPARATION THEREOF

BACKGROUND OF THE INVENTION

The present invention concerns a process for obtaining a plate of variable transparence and the product thereof. More particularly, the inventor is concerned with a plate whose transparence at every point is a function of the coordinates of this point.

Specifically, the invention proposes a process for manufacturing such plates in large quantities and in a relatively inexpensive manner. The process is such that a plurality of different plates are obtainable which are strictly identical with one another.

For this purpose, a three-dimensional form representative of the function is made. This form has a base of a contour homothetic of that of and transparent surface to be obtained. The thicknesses measured from the base is proportional to the values of the function, and the form is carried out or executed in a material which absorbs X-rays. Then, a radiograph of this three-dimensional form is made on the desired scale, and the transparent plate is the support of the radiograph thus obtained.

DESCRIPTION OF THE PRIOR ART

It has in fact been found that the conventional photographic processes were inadequate, as the transparences obtained by these photographic processes vary from one plate to the other in an uncontrollable manner.

SUMMARY OF THE INVENTION

The radiographic process according to the invention provides instead particularly good results, notably with regard to the absorption in the range of the infra-red radiations. The dispersion of these absorptions for plates of variable transparences obtained under the same conditions is in effect extremely small.

Preferably, the proportionality ratio between the values of the function and the thickness of the three-dimensional form, as well as the intensity of the X-rays, are chosen so that, for the maximum value of the function, the X-rays are substantially totally absorbed.

Thus, the best definition is obtained as the zone of the plate corresponding to the maximum value of the function is totally transparent, not having been impressed by the X-rays. The intensity of the X-rays is determined so that the zones of the plate corresponding to the minimum values of the function have a substantially total absorption; that is, the zones of the plate have been totally blackened by the X-rays.

When the three-dimensional form is a hollow form, it is preferable to obtain the form by pouring wax into a mold representative of the opposite or mirror image of the function. It is in fact easier to make a casting presenting forms in relief than hollow forms.

In an important embodiment of the invention, the function represents a voltage to be obtained at the exit of a photocell, which is placed near the transparent plate opposite a light-emitting member located on the other side of the plate. In this case, the variable thickness of the three-dimensional form is determined from a curve obtained by making test-pieces of given thickness of said X-ray absorbing material. Such test curve is obtained by radiographing these test-pieces and reading the output voltage of the photo-cell illuminated by the light-emitting member through the support of said radiographs of the test-pieces.

It has in fact been noted that the output voltage of the photo-cell is substantially linear as a function of the thickness of the test-pieces used, in particular when the emitter is an infra-red emitter. It is, however, preferable to establish the above curve in order to eliminate any nonlinearities. Moreover, with the process of first making test-pieces, X-rays of any intensity and any radiographic support can be used. It suffices that the X-rays and the supports used for radiographing the test-pieces and for radiographing the three-dimensional form are identical.

The invention also concerns a transparent plate obtained by the above process.

The objects, advantages and the nature of the invention will be fully understood and become apparent from the following description of the preferred embodiment of the invention as explained in connection with the accompaaning drawing.

The invention will now be described in greater detail in its application to the making of a transparent plate used in an injector control system of an internal combustion engine with fuel injection.

DESCRIPTION OF THE PREFERRED EMBODIMENT

Figure 1:
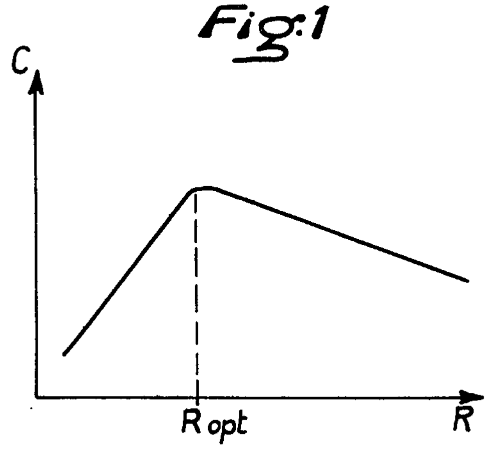
FIG. 1 is a curve showing the torque measured on the output shaft of an engine as a function of the richness of the injected mixture, for a constant operating condition.

The presently preferred mode of carrying out the process according to the invention will be described in connection with the figures of the drawing.

In this application of the invention, the transparence of the plate at each of its points must represent the optimum quantity of fuel to be injected in the cylinders of the engine for a given operating condition and given throttle opening. This transparence is ready by means of a photo-transistor which is illuminated by means of an infra-red emission diode. The photo-transistor and the diode are arranged on opposite sides of the plate facing each other. The output voltage of the transistor is then applied to the control circuit of the injectors. The photo-transistor is poled so that it produces its maximum voltage at zero illumination.

To make this transparent plate, firstly one takes the three-dimensional matrix from the values of the voltage to be applied to the control circuit of the injectors to obtain the maximum torque on the output shaft of the engine as a function of two conditions. One condition of maximum torque is taken for the operating condition, and the other condition of maximum torque is taken for the throttle opening. The curve shown in FIG. 1 represents the variation of this torque C as a function of the richness R of the mixture, that is, of the voltage applied to the control circuit of the injectors for a constant operating condition and constant throttle opening. Therefore, for each pair of values — operating condition and throttle opening — the applied voltage is varied until the torque is maximal and this voltage is read. The operation is repeated for other pairs of values choosing a sufficiently small step to obtain the desired precision.

Test-pieces are then made from different given thicknesses which are radiographed. The supports of these radiographs are then placed between an emission diode and a photo-transistor identical with those which will be used on the engine. The output voltage V of the photo-transistor is measured for each radiograph support corresponding to a test-piece of thickness *e*. One thus obtains the curve shown in FIG. 2; this curve is substantially a straight line, but it is preferable, in order to improve the process precision, to make more than two testpieces and corresponding measurements of such testpieces.

Figure 2:
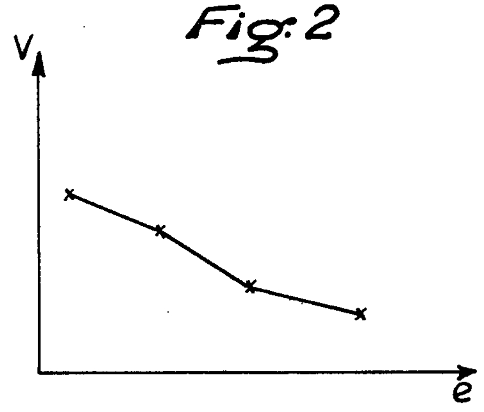
FIG. 2 is a curve which shows the output voltage of a photo-cell as a function of the thicknesses of the test-pieces used.
Figure 3:
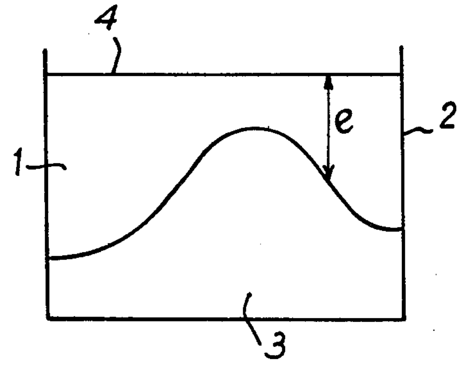
FIG. 3 illustrates diagrammatically the realization of a three-dimensional form according to the invention.
Figure 4:
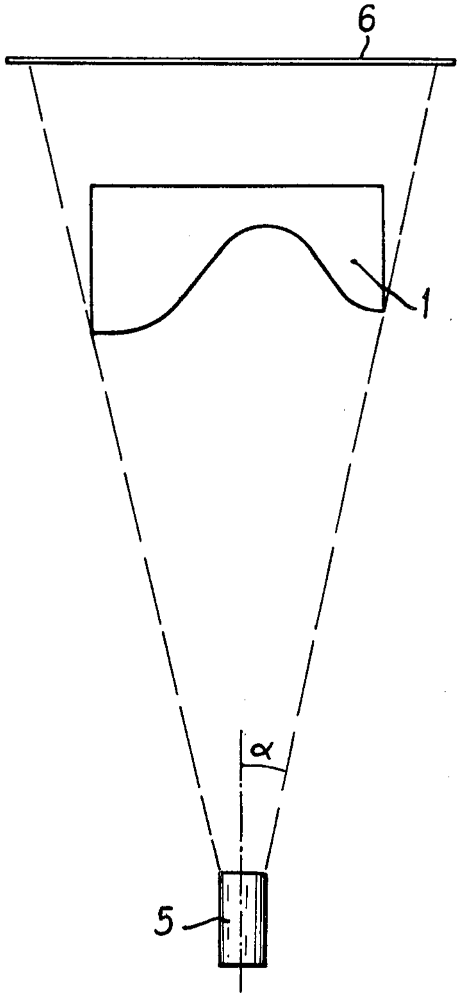
FIG. 4 is a very schematic view of an application of the process of the invention.

The voltage to be applied to the control circuit of the injectors, and hence, by the curve shown in FIG. 2, the thickness *e* of wax to be used, being thus known for each pair of values — operating condition and throttle opening — and the three-dimensional form 1 shown in FIG. 3 is made. In the embodiment shown in this FIG. 3, form 1 is obtained by pouring wax, for example ozokerite (ozocerite, a mineral or fossil wax), into a container 2. The bottom of the container is covered by a molding 3, for example — a molding paste, which reproduces the opposite of the function. The surface 4 of form 1 is homothetic to the surface of the transparent plate which is to be obtained, and preferably is equal or equivalent to it.

After stripping, form 1 is radiographed by means of the same X-ray tube and under the same conditions as the aforesaid test-pieces were radiographed. The support 6 of the radiograph is the transparent plate that was to be obtained. Preferably, the distance between tube 5 and form 1 is relatively large in relation to the dimensions of form 1 so that the opening angle will be small, and the distortions due to the inclination of the X-rays will be negligible. Thus, for a form 1 whose surface 4 is a circle of 70 mm in diameter, the distance between tube 5 and form 1 may be chosen equal to 1 m.

The present invention is, of course, not limited to the forms of realization described above, but embrace all variants of execution thereof.

While there has been described what is considered to be the preferred embodiments of the invention, various changes and modifications may be made therein without departing from the scope of the invention.

I claim:

1. Process for obtaining a transparent plate whose transparency at every point is a function of the coordinates of this point, and wherein the function represents a voltage which is obtained by placing a photocell on one side of the transparent plate and a light-emitting member on the other side of the plate opposite to the photocell, and the voltage is obtained at the exit of the photocell to form a curve characteristic of a three-dimensional form, comprising the steps of:

preparing at least one test-piece having a predetermined thickness of an X-ray absorbing material;

radiographing the test-piece with X-rays to form a radiograph of the test-piece;

recording the output voltage of the photocell illuminated by the light-emitting member through the support of the radiograph of the test-piece thus obtained;

forming the curve which is characteristic of the variable thickness of the three-dimensional form from the test-piece;

determining the variable thickness of the three-dimensional form from the curve;

forming the three dimensional form having a contour base homothetic to the surface of the transparent plate, the form having a thickness at every point substantially equal to the thickness of the test piece as measured from the base and corresponding to the voltage obtained at that point, the form being made from a material capable of absorbing X-rays; and radiographing the three-dimensional form with X-rays to form a radiograph on the transparent plate, the transparent plate being the support of the radiograph thus obtained.

2. Process as claimed in claim 1, including the steps of:

preparing a plurality of the test-pieces, each of the test-pieces being of a different thickness; and, radiographing each of the test-pieces to form the characteristic curve.

3. Process as claimed in claim 1 wherein the transparence of the transparent plate at each of its points is representative of the optimum quantity of fuel to be injected by injectors in the cylinders of an engine for a given operating condition and given throttle opening, comprising the steps of:

obtaining the maximum torque on the output shaft of the engine as a function of a constant operating condition and a constant throttle opening to obtain a value of torque as a function of the richness of the fuel mixture, and thereby the voltage applied to the control circuit of the injectors for the operating condition and throttle opening;

repeating the last-mentioned step for different constant operating conditions and constant throttle openings to obtain other values related to torque as a function of the richness of the fuel mixture; and, forming the curve to determine the voltage to be applied to the control circuit of the injectors for each pair of values of operating condition and throttle opening.

4. Process according to claim 3, comprising the steps of:

selecting the proportionality ratio between the values of the function and the thickness of said three-dimensional form as well as the intensity of the X-rays so that, for the maximum value of the function, the X-rays are substantially totally absorbed.

5. Process according to claim 3, including the step of:

pouring wax into a mold representative of the opposite of said function to obtain the three-dimensional form.

6. Process according to claim 4, including the step of:

pouring wax into a mold representative of the mirror image of said function to obtain the three-dimensional form.

7. Process according to claim 1, including the steps of:

pouring wax into a mold representative of the opposite of the function to obtain the three-dimensional form; and stripping the mold to obtain the three dimensional form; and wherein the three-dimensional form is then radiographed under the same conditions as the test-piece was radiographed.

8. Process according to claim 1, including the steps of:

forming the surface of the form which is homothetic to the surface of the transparent plate as part of a circle 70 mm. in diameter; and placing an X-ray emitting device at a distance of 1 m from the form.

9. Process according to claim 1, comprising the step of:

selecting the thickness of the three-dimensional form as well as the intensity of the X-rays so that the X-rays are substantially totally absorbed at the maximum value of the function.

10. A transparent plate whose transparency at every point is a function of the coordinates of this point and is representative of the optimum quantity of fuel to be injected by injectors in the cylinders of an engine for a given operating condition and given throttle opening, and the function represents a voltage which is obtained by placing a photocell on one side of the transparent plate and a light-emitting member on the other side of the plate opposite to the photocell, the voltage being obtained at the exit of the photocell to form a curve characteristic of a three-dimensional form, comprising:

a support;

a radiograph on said support, said radiograph being obtained by determining the variable thickness of the three-dimensional form from a characteristic curve obtained by making test-pieces of given thickness of X-ray absorbing material, radiographing the test-pieces, recording the output voltage of the photocell to form the characteristic curve, and forming the three-dimensional form with a contour base homothetic to the surface of the transparent plate from the characteristic curve and from a material capable of absorbing X-rays, then radiographing the three-dimensional form under the same conditions as the test-piece was radiographed; and said support and said radiograph on said support together forming a transparent plate having a transparency at every point which is a function of the coordinates of the point.

* * * * *